United States Patent
Soma et al.

(10) Patent No.: US 9,893,580 B2
(45) Date of Patent: Feb. 13, 2018

(54) ROTOR FOR ROTARY ELECTRIC MACHINE

(71) Applicant: HONDA MOTOR CO., LTD., Tokyo (JP)

(72) Inventors: Shingo Soma, Wako (JP); Eiji Shirado, Wako (JP); Tomotaka Iki, Wako (JP); Yasunori Date, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 508 days.

(21) Appl. No.: 14/174,749

(22) Filed: Feb. 6, 2014

(65) Prior Publication Data

US 2014/0217849 A1 Aug. 7, 2014

(30) Foreign Application Priority Data

Feb. 7, 2013 (JP) ................................. 2013-022599

(51) Int. Cl.
*H02K 1/27* (2006.01)

(52) U.S. Cl.
CPC ........... *H02K 1/2766* (2013.01); *H02K 1/276* (2013.01); *H02K 2213/03* (2013.01)

(58) Field of Classification Search
CPC ... H02K 1/2766; H02K 1/276; H02K 2213/03

(Continued)

(56) References Cited

U.S. PATENT DOCUMENTS 7,282,827 B2 * 10/2007 Futami ................... H02K 1/276
                                                            310/156.48
7,612,480 B2 * 11/2009 Fujii ..................... H02K 1/2766
                                                            310/156.53

(Continued)

FOREIGN PATENT DOCUMENTS

JP      2000-278896      10/2000
JP      2005-094968      4/2005

(Continued)

OTHER PUBLICATIONS

English translation of KR 20100075057; Jul. 2010; Honh Jung Pyo et al. ; Korea.*

(Continued)

*Primary Examiner* — Bernard Rojas
*Assistant Examiner* — Ahmed Elnakib
(74) *Attorney, Agent, or Firm* — Mori & Ward, LLP

(57) ABSTRACT

A rotor for a rotary electric machine includes a plurality of magnetic poles in a rotor core, a side barrier as a magnetic air gap, an air gap section as a magnetic air gap. Each of the plurality of magnetic poles includes a magnet insertion hole, a permanent magnet. The side barrier is provided at a portion adjacent to a circumferential end face of the permanent magnet and includes a projection barrier portion projecting radially outwardly from an extension line extending from an outer peripheral surface of the permanent magnet. The air gap section is provided at an area which is spaced apart from the projection barrier portion and the magnet insertion hole and faces a peripheral edge of a circumferentially central side of the magnetic pole with respect to the projection barrier portion and a circumferential end of the outer peripheral surface of the permanent magnet.

12 Claims, 15 Drawing Sheets

(58) Field of Classification Search
USPC ............ 310/156.53, 156.56, 156.57, 156.83; 29/598
See application file for complete search history.

(56) References Cited

U.S. PATENT DOCUMENTS

| | | | | |
|---|---|---|---|---|
| 7,667,363 B2* | 2/2010 | Adaniya | ................ | H02K 1/276 310/156.53 |
| 7,868,502 B2* | 1/2011 | Lee | ................ | H02K 1/276 310/156.48 |
| 2004/0007930 A1* | 1/2004 | Asai | ................ | H02K 1/2746 310/156.53 |
| 2006/0028082 A1* | 2/2006 | Asagara | ................ | H02K 1/276 310/156.53 |
| 2006/0145556 A1* | 7/2006 | Aota | ................ | H02K 1/276 310/156.53 |
| 2009/0026865 A1* | 1/2009 | Aota | ................ | H02K 1/276 310/156.01 |
| 2009/0184597 A1 | 7/2009 | Lee | | |
| 2012/0242182 A1* | 9/2012 | Yabe | ................ | H02K 29/03 310/156.53 |

FOREIGN PATENT DOCUMENTS

| | | |
|---|---|---|
| JP | 2008-278591 | 11/2008 |
| JP | 2009-273258 | 11/2009 |
| JP | 2012-023876 | 2/2012 |
| KR | 20060019118 | 3/2006 |
| WO | WO 2011/096094 | 8/2011 |

OTHER PUBLICATIONS

English translation of JP 2008278591; Matsubara et al. Nov. 2008; Japan.*
English translation of KR 20100075057; Jul. 2010; Pyo et al.; South Korea.*
Chinese Office Action for corresponding CN Application No. 201410044798.X, dated Dec. 25, 2015.
Japanese Office Action for corresponding JP Application No. 2013-022599, dated Aug. 30, 2016 (w/ English machine translation).

* cited by examiner

BACKGROUND ART

US 9,893,580 B2

ROTOR FOR ROTARY ELECTRIC MACHINE

CROSS REFERENCES TO RELATED APPLICATIONS

The present application claims priority under 35 U.S.C. § 119 to Japanese Patent Application No. 2013-022599, filed Feb. 7, 2013, entitled "Rotor for Rotary Electric Machine." The contents of this application are incorporated herein by reference in their entirety.

BACKGROUND

1. Field

The present disclosure relates to a rotor for a rotary electric machine.

2. Description of the Related Art

Known conventional rotor used for a rotary electric machine includes a plurality of magnetic poles which are circumferentially disposed inside a rotor core at predetermined intervals (for example, see Japanese Unexamined Patent Application Publication No. 2000-278896).

As illustrated in FIG. 16, in the rotor 110 disclosed in Japanese Unexamined Patent Application Publication No. 2000-278896, outer peripheral portions of circumferential end faces of a permanent magnet 112 of a rotor core 111 are provided with radial flux barriers (magnetic flux blocking sections) 113, 114, respectively. In addition, radially outer ends of the flux barrier 113, 114 are provided with projection 113a, 114a, and the space 100L between the flux barriers 113 and 114 is shorter than the width 100W of the permanent magnet 112. Furthermore, iron cores 115 are provided between the permanent magnet 112 and the projections 113a, 114a of the flux barriers 113, 114.

This configuration is intended to reduce occurrence of a magnetic flux short circuit of the permanent magnet 112 and to optimize distribution of the magnetic flux of the permanent magnet 112 so as to improve the rotor torque.

SUMMARY

According to one aspect of the present invention, a rotor for a rotary electric machine includes a rotor core, a plurality of magnetic poles, a side barrier as a magnetic air gap, an air gap section as a magnetic air gap. The plurality of magnetic poles are provided in the rotor core along a circumferential direction of the rotor core at predetermined intervals. Each of the plurality of magnetic poles includes a magnet insertion hole, a permanent magnet. The magnet insertion hole is provided in the rotor core. The permanent magnet is provided in the magnet insertion hole so that a magnetized direction of the permanent magnet extends substantially in a radial direction of the rotor core and the magnetized direction is alternately changed circumferentially. The side barrier is provided in the rotor core at a portion adjacent to a circumferential end face of the permanent magnet. The side barrier includes a projection barrier portion projecting radially outwardly from an extension line extending from an outer peripheral surface of the permanent magnet. The air gap section is provided in the rotor core at an area which is spaced apart from the projection barrier portion and the magnet insertion hole. The air gap section faces a peripheral edge of a circumferentially central side of the magnetic pole with respect to the projection barrier portion and a circumferential end of the outer peripheral surface of the permanent magnet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
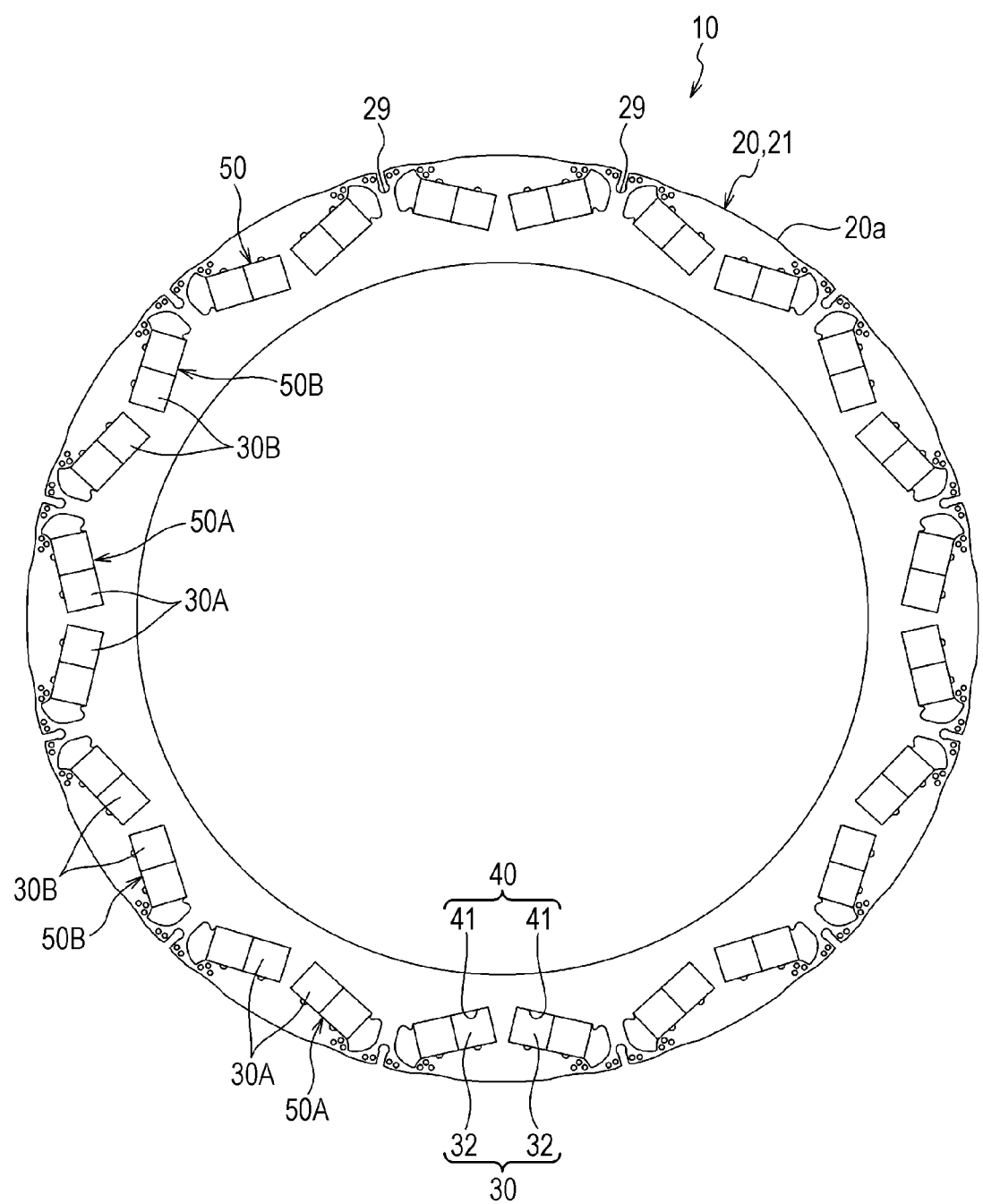
FIG. 1 is a front view of a rotor according to a first embodiment.

The embodiments will now be described with reference to the accompanying drawings, wherein like reference numerals designate corresponding or identical elements throughout the various drawings.

Hereinafter, a rotor for a rotary electric machine according to each of the embodiments of the present disclosure will be described.

Figure 2:
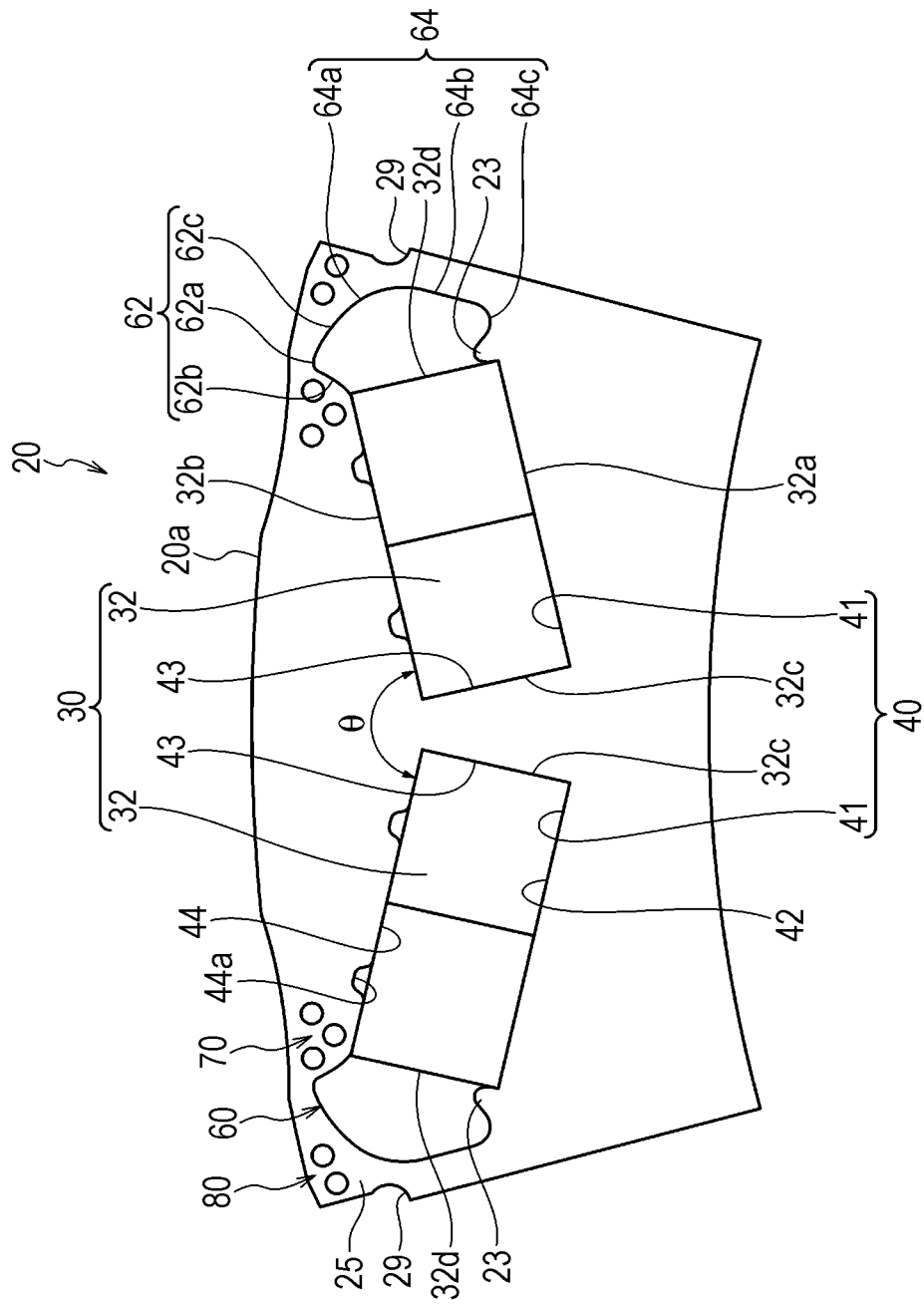
FIG. 2 is a partially enlarged view of a rotor core of FIG. 1.

As illustrated in FIGS. 1 and 2, a rotor 10 of a rotary electric machine in a first embodiment includes a rotor core 20 mounted on the outer peripheral surface of a substantially cylindrical rotor shaft (not illustrated) which serves as a rotational shaft, and a plurality of magnetic poles 50 which are circumferentially formed at predetermined intervals inside the rotor core 20. The rotor 10 is disposed on the radially inner side of a stator (not illustrated).

The rotor core 20 is formed by stacking a great number of substantially the same annular-shaped magnetic steel sheets, for example, a silicon steel sheet 21. In the rotor core 20, a plurality of magnet insertion holes 40 are circumferentially formed at predetermined intervals, and a groove 29 is provided between adjacent magnet insertion holes 40.

Each of the magnetic poles 50 is magnetized in a radial direction and formed by inserting a permanent magnet 30 in each of the magnet insertion holes 40 so that the magnetization direction is circumferentially alternately changed. More specifically, when the radially outer side of a magnetic pole 50A is the N pole, the radially outer side of a magnetic pole 50B adjacent to the magnetic pole 50A is the S pole, the magnetic pole 50A being formed by inserting a permanent magnet 30A in the magnet insertion hole 40, the magnetic pole 50B being formed by inserting a permanent magnet 30B in the magnet insertion hole 40.

The permanent magnet 30 is formed by a pair of permanent magnet pieces 32 which are circumferentially separated, and the permanent magnet pieces 32 in the pair have substantially the same rectangular cross section.

The magnet insertion hole 40 is formed by a pair of magnet insertion holes 41 which are circumferentially separated. The pair of magnet insertion holes 41 has a substantially V-shaped cross section so that the outer peripheral surfaces 32b of the pair of permanent magnet pieces 32 form an angle less than 180°, the permanent magnet pieces 32 being circumferentially adjacent to each other. The pair of permanent magnet pieces 32 is inserted and fixed in the pair of magnet insertion holes 41. The magnet insertion holes 41 are formed such that an inner peripheral edge 42 and an outer peripheral edge 44 thereof are in contact with an inner circumferential surface 32a and an outer peripheral surface 32b of the pair of permanent magnet pieces 32, respectively. The pair of permanent magnet pieces 32 is positioned in a radial direction by the magnet insertion holes 41.

The rotor core 20 has a pair of holding units 23 which are formed circumferentially outward of the pair of permanent magnet pieces 32 and extend outwardly in a radial direction from the inner peripheral edges 42 of the magnet insertion holes 41. Circumferentially inner edges 43 of the magnet insertion holes 41 are in contact with inner end faces 32c of the pair of permanent magnet pieces 32. The pair of holding units 23 is in contact with circumferentially outer end faces 32d of the pair of permanent magnet pieces 32. The pair of permanent magnet pieces 32 is circumferentially positioned and held by the circumferentially inner edges 43 of the magnet insertion holes 41 and the pair of holding units 23.

The outer peripheral edges 44 of the magnet insertion holes 41 are provided with a plurality of resin filling holes 44a which are recessed to the radially outer side, and the pair of permanent magnet pieces 32 can be firmly fixed to the rotor core 20 by filling the resin filling holes 44a with resin.

Figure 3:
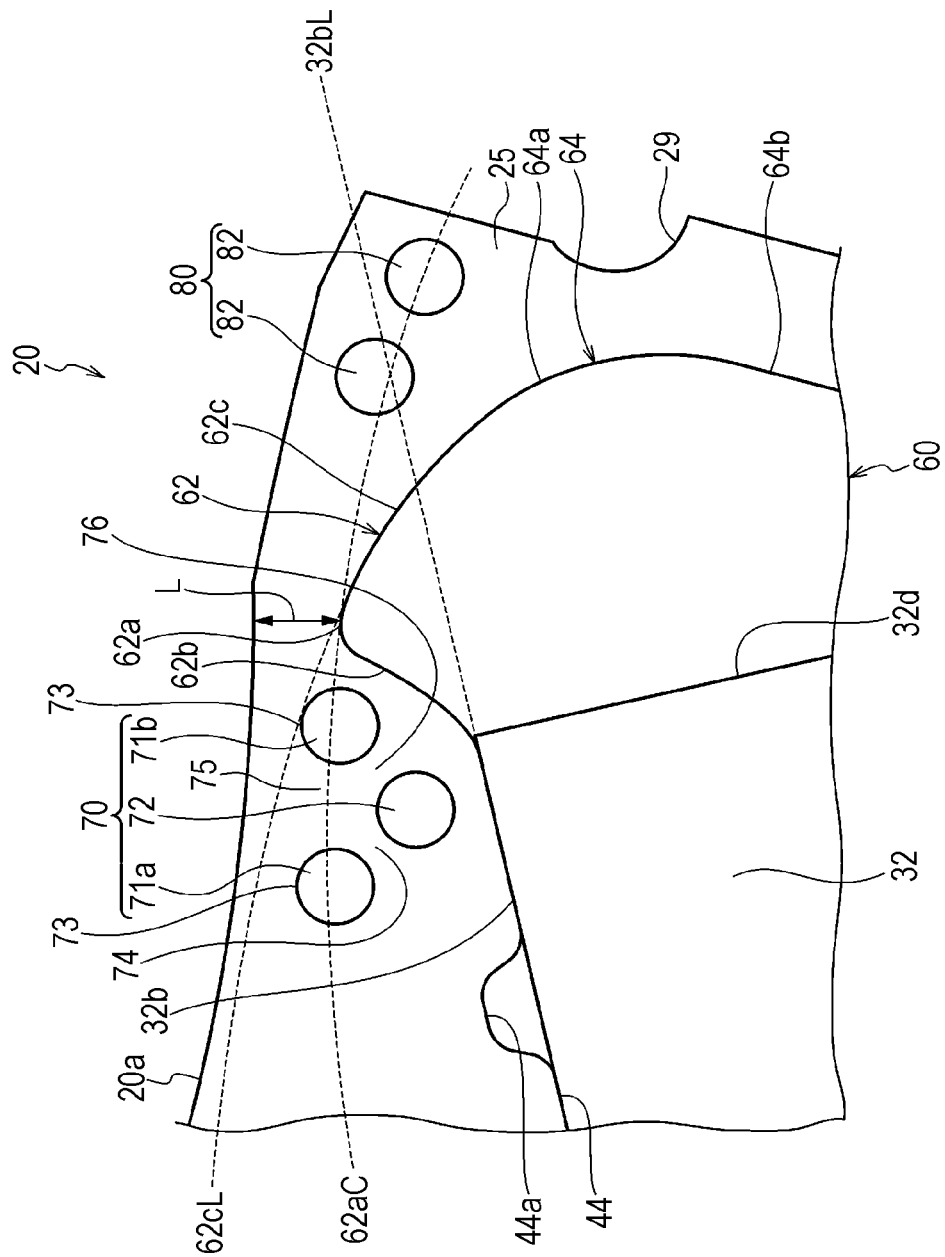
FIG. 3 is an enlarged view of a main portion of the rotor core of FIG. 2.

Referring to FIG. 3, a side barrier 60, which penetrates through in the shaft direction and serves as a magnetic air gap, is formed in an area adjacent to the circumferentially outer end face 32d of each permanent magnet piece 32 in the rotor core 20.

The side barrier 60 includes a projection barrier portion 62 and a radially inner side barrier portion 64 which are integrally formed, the projection barrier portion 62 extending outwardly of an extension line 32bL of the outer peripheral surface 32b of the permanent magnet piece 32, the radially inner side barrier portion 64 disposed radially inwardly of the projection barrier portion 62.

The projection barrier portion 62 has a top portion 62a located at a radially outermost position, a central peripheral edge 62b, and an end peripheral edge 62c, the central peripheral edge 62b extending radially inwardly from the top portion 62a toward the circumferentially central side (the left side in FIG. 3) of the magnetic pole 50, the end peripheral edge 62c extending radially inwardly from the top portion 62a toward the circumferentially end side (the right side in FIG. 3) of the magnetic pole 50, and thus the projection barrier portion 62 has an approximately triangular cross-section. A thickness L between the top portion 62a of the projection barrier portion 62 and the outer peripheral surface 20a of the rotor core 20 is appropriately set so as to provide strength for withstanding the centrifugal force generated at the time of rotation of the rotor and to reduce occurrence of a magnetic flux short circuit.

The radially inner side barrier portion 64 is connected to the end peripheral edge 62c of the projection barrier portion 62, and has an outer peripheral portion 64a, an extending portion 64b, and an inner peripheral portion 64c, the outer peripheral portion 64a being located at the end of the magnetic pole 50 and extending in a curve toward the radially inner side, the extending portion 64b being connected with the outer peripheral portion 64a and extending in a line toward the radially inner side, the inner peripheral portion 64c connecting between the extending portion 64b and the holding unit 23 and extending in a curve which is convex toward the radially inner side.

In the rotor core 20, a first air gap section 70, which penetrates through in the shaft direction and serves as a magnetic air gap, is formed in an area which is spaced apart from the projection barrier portion 62 and the magnet insertion hole 40 (the permanent magnet piece 32), and which faces the central peripheral edge 62b of the projection barrier portion 62 and the circumferentially outer end of the outer peripheral surface 32b of the permanent magnet piece 32.

Figure 4:
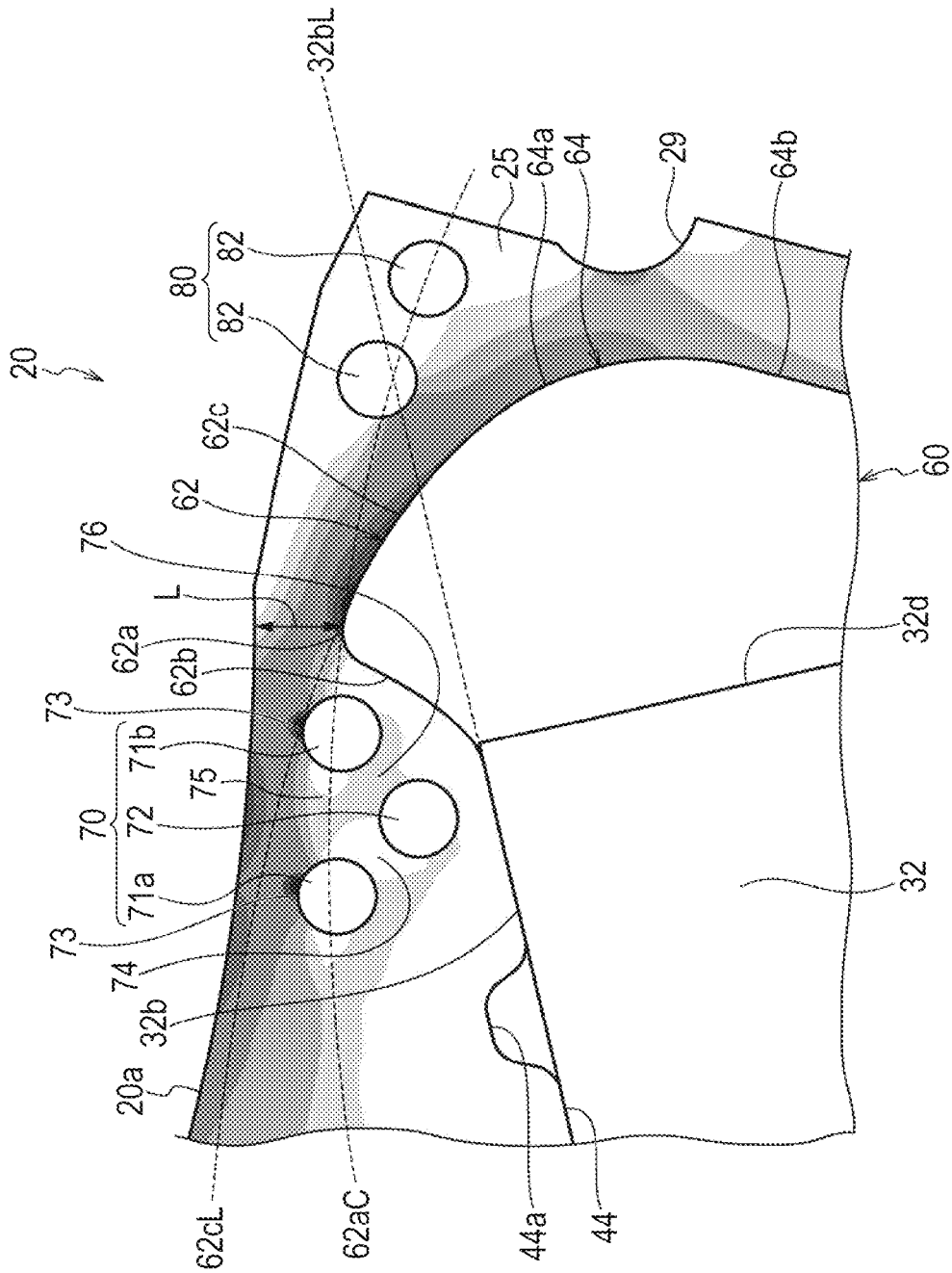
FIG. 4 is a view illustrating a stress distribution in the rotor core of FIG. 3.

The first air gap section 70 is formed as an air gap group including two first air gaps 71a, 71b, and a second air gap 72, the first air gaps 71a, 71b being circumferentially disposed between the outer peripheral surface 20a of the rotor core 20 and the outer peripheral edge 44 of the magnet insertion hole 40, the second air gap 72 being formed radially inwardly of the first air gaps 71a, 71b circumferentially between the first air gaps 71a and 71b. A radially outer edge 73 of the air gap group is provided inwardly of an extension line 62cL which circumferentially extends from the end peripheral edge 62c of the projection barrier portion 62 toward the central side of the magnetic pole 50. FIG. 4 illustrates an image with varying densities of stress distribution in the rotor core 20, and darker area indicates an area where centrifugal stress is greater, and lighter area indicates an area where centrifugal stress is less. In this manner, a belt-like area, in which a relatively higher centrifugal stress occurs, is formed outwardly of the extension line 62cL. However, decrease in the strength of the rotor core 20 is reduced by providing the air gap group radially inwardly of the extension line 62cL. Thus, the air gap group is not limited to have the configuration in which the radially outer edge 73 is disposed radially inwardly of the extension line 62cL, and the radially outer edge 73 may be disposed on the extension line 62cL.

Hereinafter, out of the two first air gaps 71a, 71b, the first air gap 71a near the circumferentially central side of the magnetic pole 50 may be referred to as the central side first air gap, and the first air gap 71b near the end side of the magnetic pole 50 may be referred to as the end side first air gap.

The two first air gaps 71a, 71b are disposed on a circle 62aC having an approximately the same radius as that of the top portion 62a of the projection barrier portion 62. The end side first air gap 71b and the second air gap 72 are disposed along the central peripheral edge 62b of the projection barrier portion 62.

By configuring the first air gap section 70 in this manner, a central side rib 74 is formed between the central side first air gap 71a and the second air gap 72, a middle rib 75 is formed between the two first air gaps 71a and 71b, and an end side rib 76 is formed between the end side first air gap 71b and the second air gap 72 in the rotor core 20.

In the rotor core 20, a connection rib 25 is formed between the side barrier 60 and the outer peripheral surface 20a, the groove 29 of the rotor core 20, the connection rib 25 extending circumferentially and radially and connecting between an area radially outwardly of the permanent magnet piece 32 and an area radially inwardly of the groove 29.

In the connection rib 25, there is formed a second air gap section 80 which penetrates through in the shaft direction and serves as a magnetic air gap, the second air gap section 80 including two third air gaps 82 which are disposed apart from each other on the circle 62aC.

Comparison Between First Embodiment and Comparative Example

Next, in order to compare the rotor core 20 (see FIG. 5) in the present embodiment with a rotor core 200 (see FIG. 6) as a comparative example which is not provided with the first air gap section 70 and the second air gap section 80, permeance distribution in the permanent magnet piece 32 and magnetic circuits (magnetic paths) in the rotor cores 20, 200 were analyzed.

Figure 5:
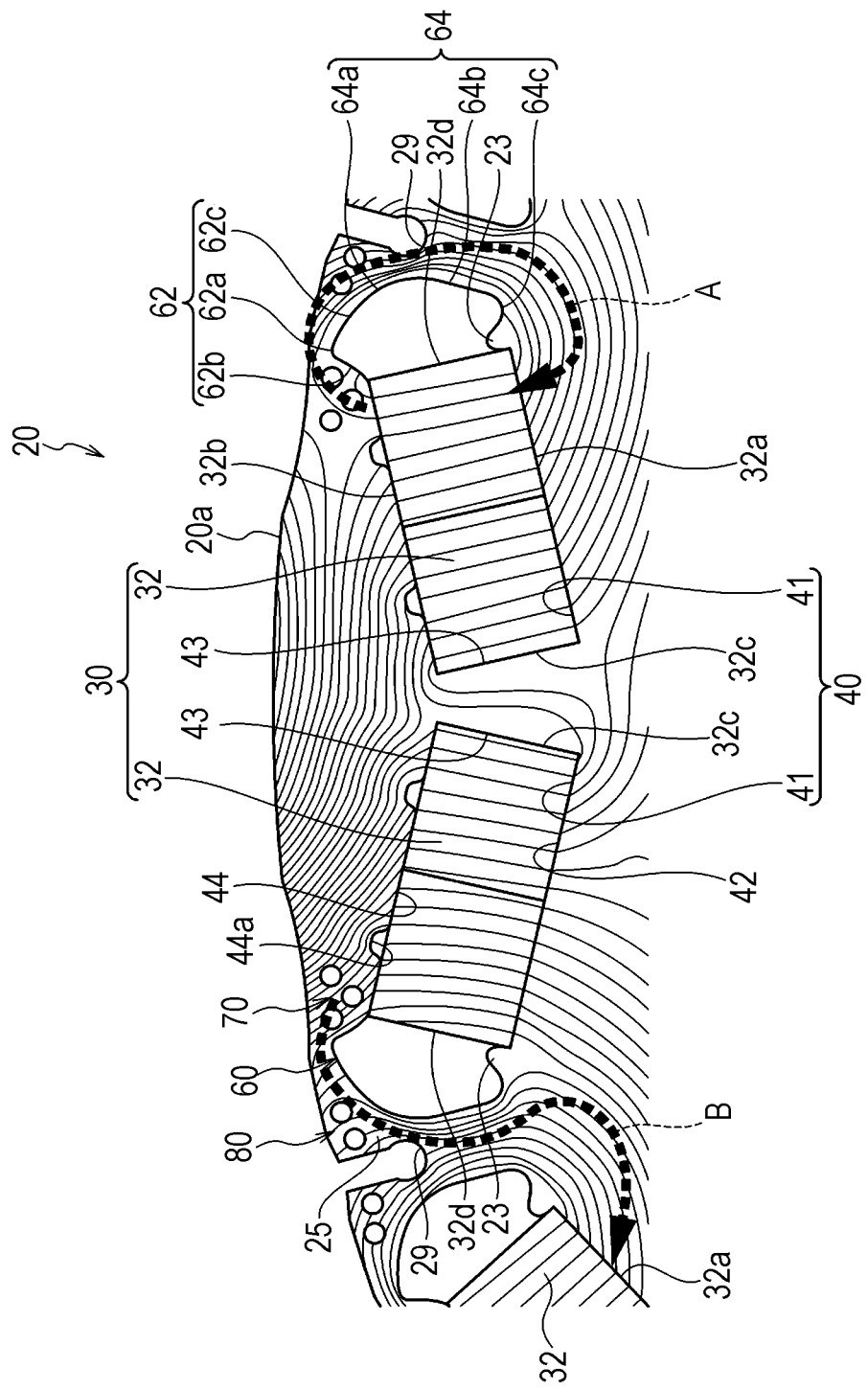
FIG. 5 is a partially enlarged view illustrating magnetic paths in the rotor core according to the first embodiment.
Figure 6:
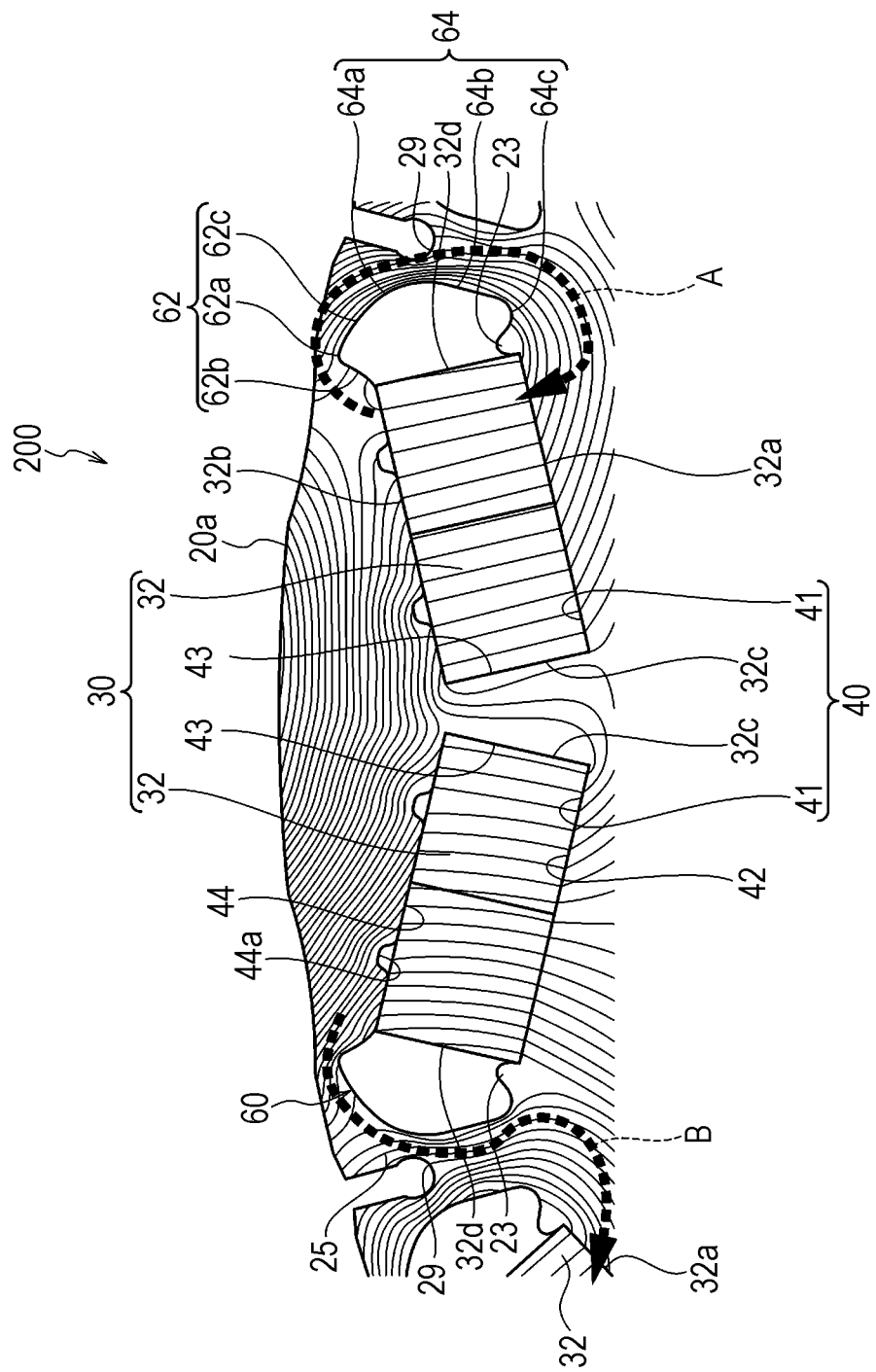
FIG. 6 is a partially enlarged view illustrating magnetic paths in the rotor core according to a comparative example.
Figure 7A:
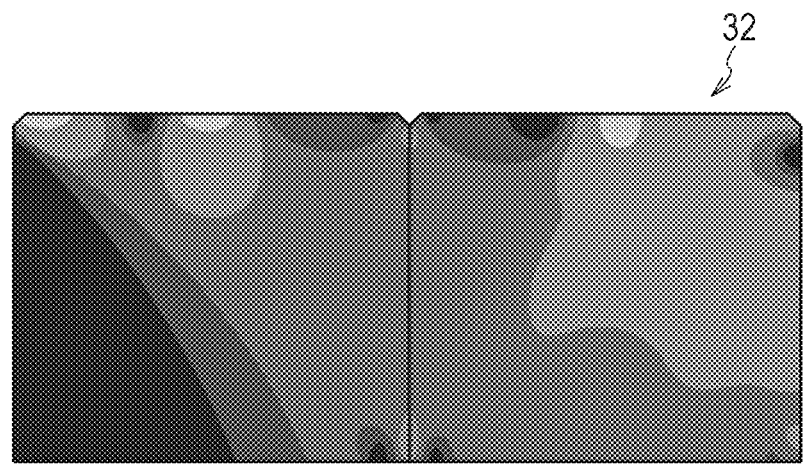
FIGS. 7A and 7B are each a view illustrating a permeance distribution in a permanent magnet piece in the first embodiment and the comparative example, respectively.
Figure 7B:
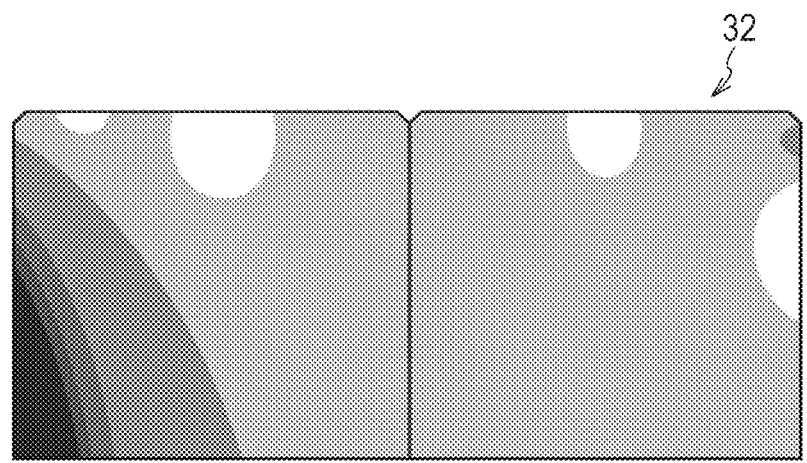

FIGS. 5 and 6 each illustrate magnetic paths in the rotor cores 20 and 200 in the first embodiment and the comparative example, respectively. FIGS. 7A and 7B each illustrate an image with varying densities of the permeance distribution in the permanent magnet piece 32 in the first embodiment and the comparative example, respectively. In the permanent magnet piece 32, a darker area indicates a higher permeance, and a lighter area indicates a lower permeance. This observation demonstrates that the permanent magnet piece 32 (see FIG. 7A) according to the present embodiment has a larger area with a high permeance than the permanent magnet piece 32 (see FIG. 7B) according to the comparative example.

This is because in the rotor core 200 according to the comparative example, as illustrated in FIG. 6, a magnetic flux, which is generated from the circumferentially outer end of the outer peripheral surface 32b of the permanent magnet piece 32, is short-circuited (see arrow A) through the connection rib 25 to the inner circumferential surface 32a of the same permanent magnet piece 32, or short-circuited (see arrow B) through the connection rib 25 to the inner circumferential surface 32a of a permanent magnet piece 32 included in an adjacent magnetic pole 50.

That is, in the comparative example, these generated short-circuited magnetic fluxes reduce the amount of magnetic flux toward the stator (not illustrated) disposed radially outwardly of the rotor 10, and thus the magnetic permeability is reduced.

On the other hand, in the rotor core 20 according to the present embodiment, as illustrated in FIG. 5, the first air gap section 70 is formed on a magnetic flux short circuit path, that is, an area which faces the central peripheral edge 62b of the projection barrier portion 62 and the circumferentially outer end of the outer peripheral surface 32b of the permanent magnet piece 32, and thus occurrence of a magnetic flux short circuit is reduced. In addition, the second air gap section 80 is also formed in the connection rib 25 which is on the magnetic flux short circuit path, and thus occurrence of a magnetic flux short circuit is further reduced. Consequently, the magnetic permeability of the rotor core 20 in the present embodiment is much improved as compared with the rotor core 200 in the comparative example.

Permeance P is expressed by the following formula. $P=\mu\times(A/L)$ where $\mu$ is magnetic permeability, A is magnetic path cross-sectional area, and L is magnetic path length.

Thus, as illustrated in FIGS. 7A and 7B, the permeance of the permanent magnet piece 32 according to the present embodiment is higher than the permeance in the comparative example. In the above, the magnetic permeability $\mu$ indicates how easily magnetic flux flows in a loop of magnetic flux which is applied from the permanent magnet 30 to the stator, and thus when many magnetic fluxes fail to be applied to the stator, that is, when many magnetic flux short circuits occur, the magnetic permeability is reduced.

Figure 8:
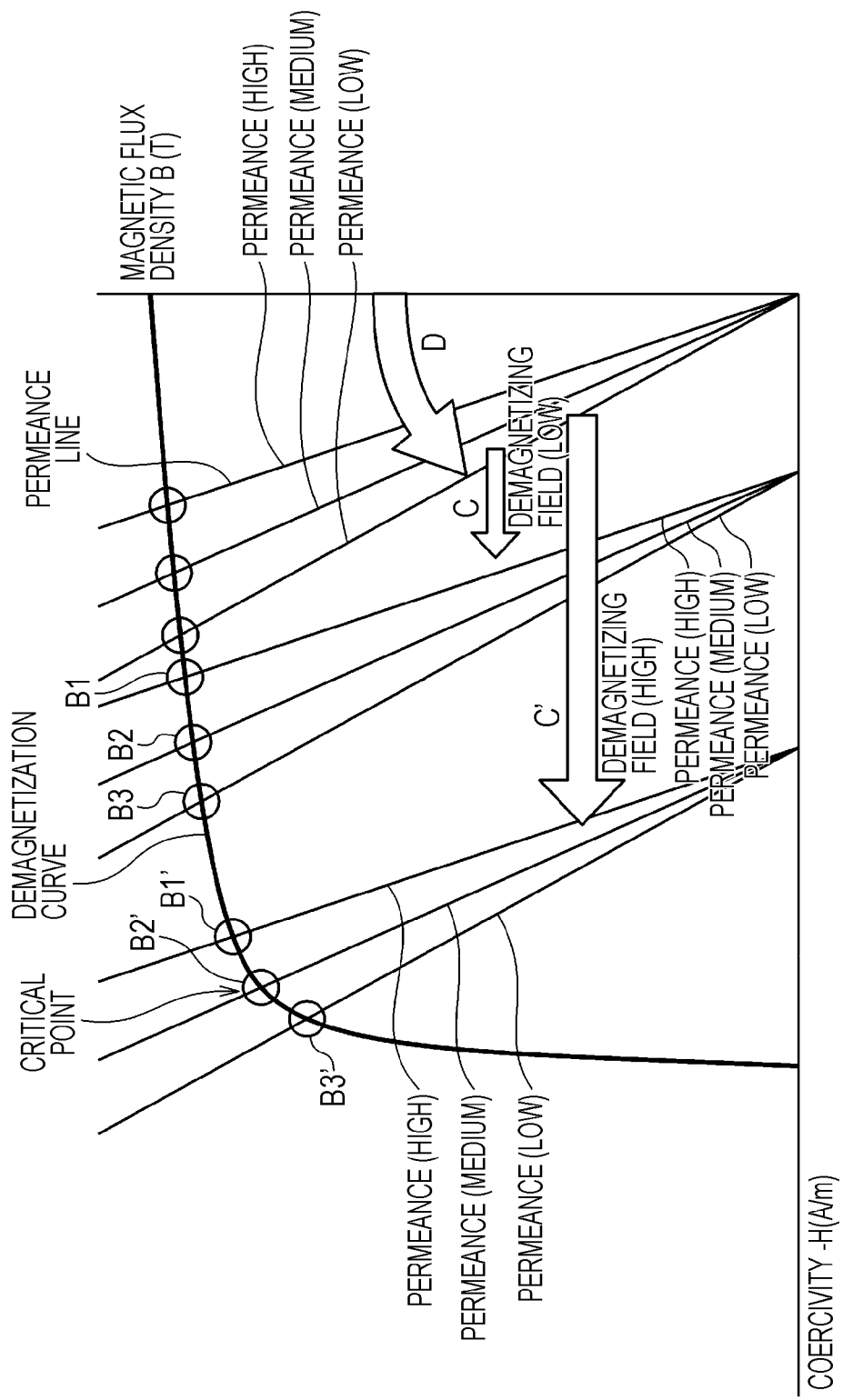
FIG. 8 is a graph illustrating a demagnetization curve and permeance lines of the permanent magnet.

FIG. 8 is a graph illustrating a demagnetization curve and permeance lines of the permanent magnet where the vertical axis indicates magnetic flux density $\{B(T)\}$ and the horizontal axis indicates coercive $\{-H(A/m)\}$. An operating point of the permanent magnet is determined by the intersection (the portion indicated by O in FIG. 8) of the demagnetization curve and a permeance line. When a current is applied to the stator, demagnetizing field acts on the permanent magnet, and the permeance lines move in the negative direction as indicated by arrows C and C'.

When a low demagnetizing field acts on the permanent magnet, the movement of the permeance lines in the negative direction is small as indicated by arrow C, and thus intersections B1, B2, B3 of the demagnetization curve and the permeance lines are located before (the upper side of FIG. 8) a critical point. Thus, demagnetization does not occur in the permanent magnet, or the degree of demagnetization is low if any demagnetization occurs.

On the other hand, when a high demagnetizing field acts on the permanent magnet, the movement of the permeance lines in the negative direction is large as indicated by arrow C', and thus intersections B1', B2', B3' of the demagnetization curve and the permeance lines are located in the vicinity of the critical point, and the permanent magnet may be demagnetized.

In an area with a high permeance in the permanent magnet, the slope (permeance coefficient) of a permeance line is high, and thus the intersection B1' of the demagnetization curve and the permeance line is located before the critical point (closer to the B-axis), and the degree of demagnetization is low. In addition, a corresponding operating point of the permanent magnet in B-H curve is located closer to the B-axis, and thus the magnetic flux density increases and the torque also increases.

However, in an area where the permanent magnet has a low permeance, the slope of a permeance line is low and is inclined in the direction indicated by arrow D, and thus the intersection B3' of the demagnetization curve and the permeance line exceeds the critical point, and the magnetic flux density rapidly decreases. Therefore, in the case where an operating point once exceeds the critical point in part of the permanent magnet and the magnetic flux density has reduced, even when action of the demagnetizing field is no longer present, the magnetic flux density of the permanent magnet reduces lower than the original magnetic flux density, and the permanent magnet is demagnetized and the torque also decreases.

In this manner, the degree of demagnetization of the permanent magnet increases and the torque decreases as the permeance decreases. That is, demagnetization of the permanent magnet can be reduced and the torque increases as the permeance increases.

Therefore, in the rotor 10 of a rotary electric machine according to the present embodiment, demagnetization of the permanent magnet 30 is reduced and the rotor torque increases because the permeance of the permanent magnet piece 32 is higher than the permeance in the comparative example.

Comparison Between First and Second Embodiments

Next, in order to compare the rotor core 20 (see FIGS. 1 to 3) in the first embodiment with a rotor core 20A (see FIG. 9) in a second embodiment in which only the configuration of the first air gap section 70 is modified, permeance distribution in the permanent magnet piece 32, magnetic circuits (magnetic paths) in the rotor cores 20, 20A, rotor torque, and demagnetization of the permanent magnet piece 32 were analyzed.

Figure 9:
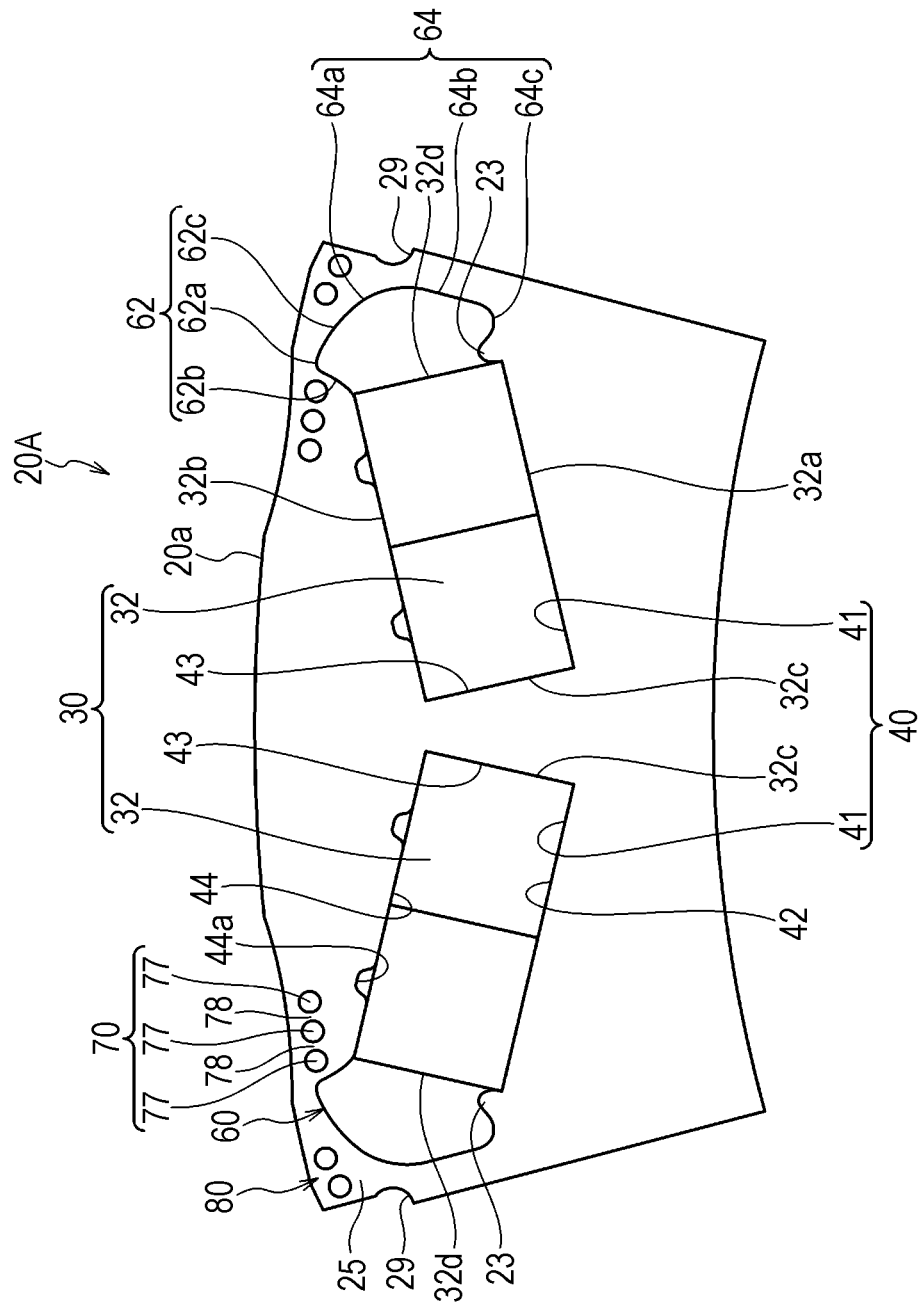
FIG. 9 is a partially enlarged view of a rotor core according to a second embodiment.

As illustrated in FIG. 9, the rotor core 20A according to the second embodiment differs from the rotor core 20 (see FIGS. 1 to 3) in the first embodiment in that the first air gap section 70 is formed as an air gap group including three fourth air gaps 77 which are circumferentially disposed and spaced apart from each other. However, the rotor core 20A and the rotor core 20 share the same configuration except for this difference. The radial positions of the three fourth air gaps 77 are set to be approximately equal to those of the first air gaps 71a, 71b (see FIG. 3) in the first embodiment. Between adjacent fourth air gaps 77, a rib 78 is formed which extends in a radial direction.

Figure 10A:
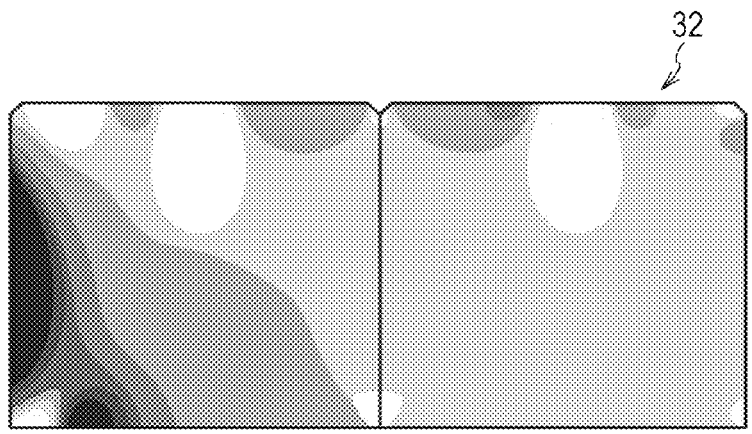
FIGS. 10A to 10C are each a view illustrating a permeance distribution in the permanent magnet piece in the first to third embodiments, respectively.
Figure 10B:
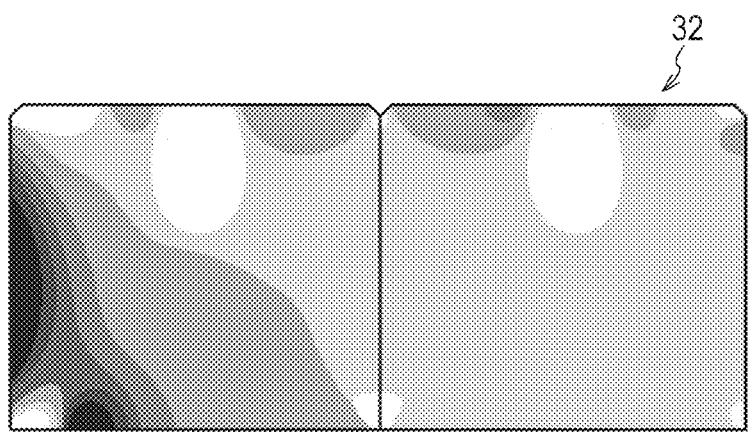
Figure 10C:
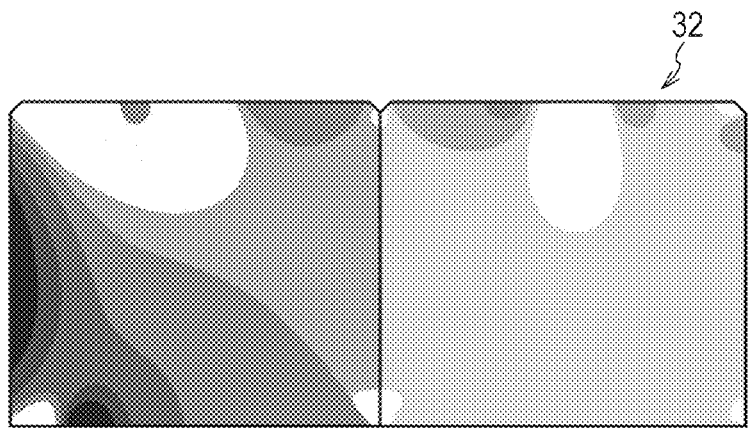
Figure 13:
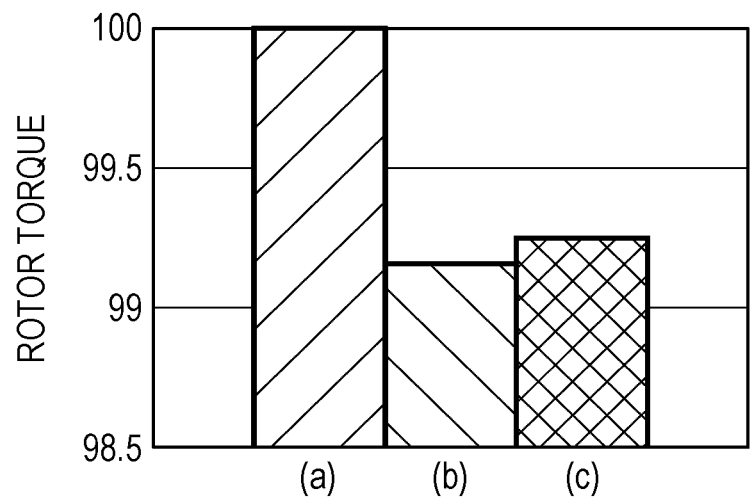
FIG. 13 is a graph illustrating rotor torques in the first to third embodiments.
Figure 14:
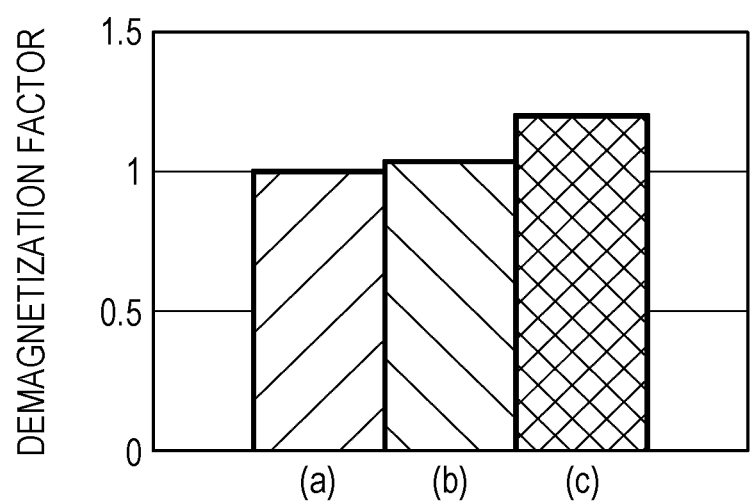
FIG. 14 is a graph illustrating demagnetization factors of the permanent magnet in the first to third embodiments.

FIGS. 10A to 10C each illustrate an image with varying densities of the permeance distribution in the permanent magnet piece 32 in the first to third embodiments, respectively. In the permanent magnet piece 32, a darker area indicates a higher permeance, and a lighter area indicates a lower permeance. FIGS. 11A and 11B, and FIGS. 12A and 12B each illustrate the magnetic paths in the rotor cores 20 and 20A in the first embodiment and the second embodiment, respectively. FIG. 13 illustrates the rotor torques in the first to third embodiments under the assumption that the rotor torque in the first embodiment is 100. FIG. 14 illustrates the demagnetization factors in the first to third embodiments under the assumption that the demagnetization factor of the permanent magnet piece 32 in the first embodiment is 1.

Figure 11A:
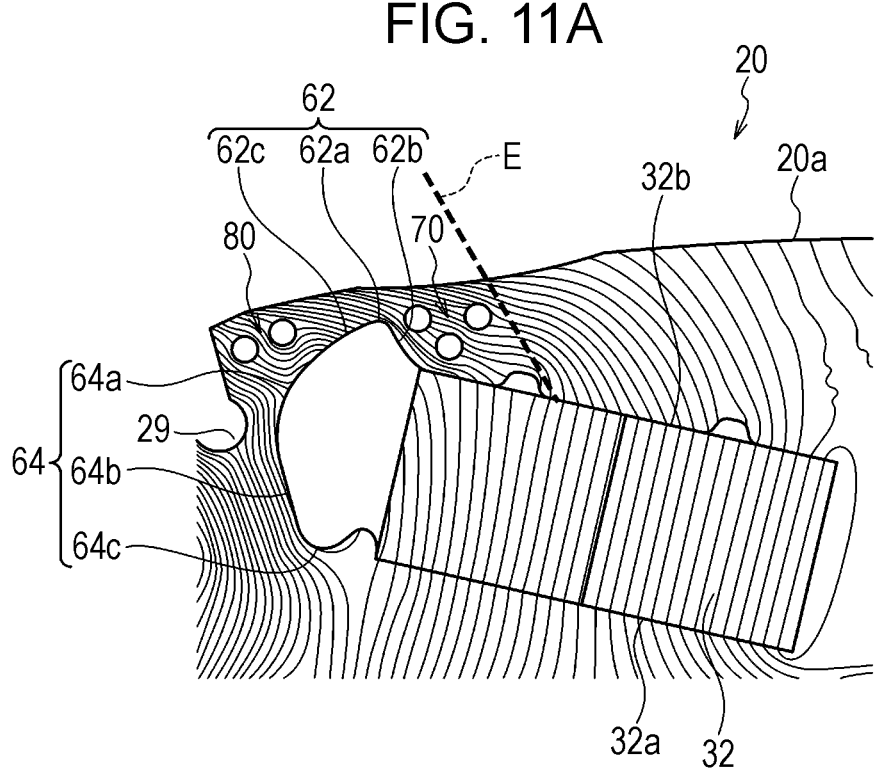
FIG. 11A is an enlarged view of a main portion illustrating the magnetic paths in the rotor core according to the first embodiment.
Figure 11B:
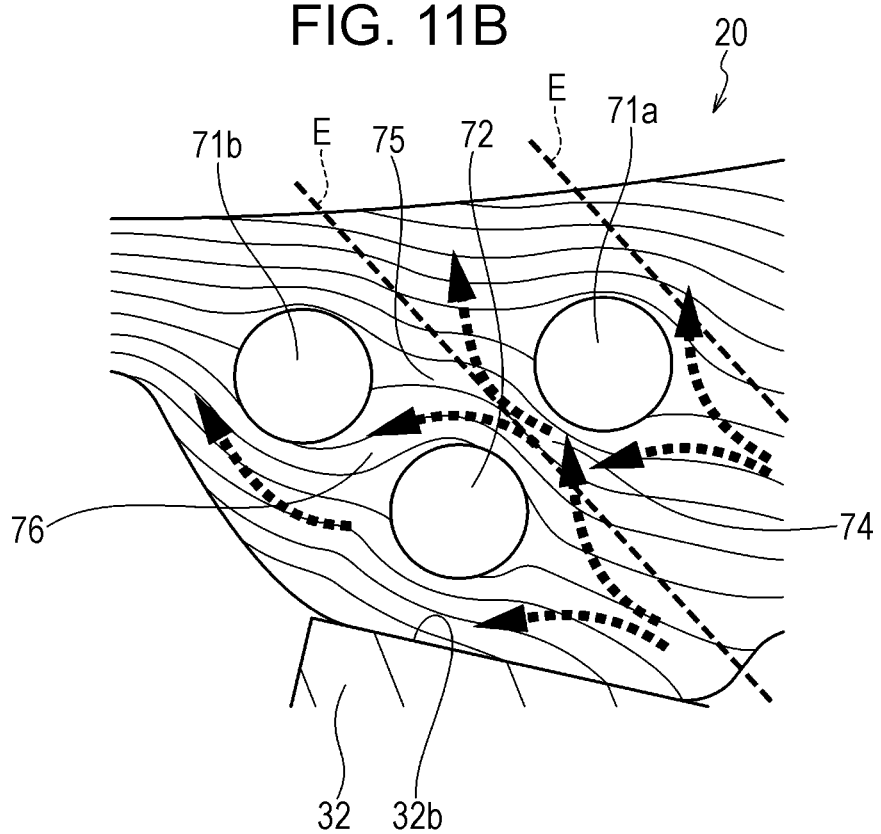
FIG. 11B is an enlarged view of FIG. 11A.

Referring to FIGS. 11A and 11B, in the rotor core 20 according to the first embodiment, the central side rib 74, the middle rib 75, and the end side rib 76, which are formed between the air gaps in the air gap group, are connected to each other and disposed with an angle between the air gaps, and thus the number of magnetic flux paths toward the stator can be increased as indicated by dotted line arrows (see FIG. 11B). In addition, the first air gaps 71a, 71b and the second air gap 72 are not present on an inclined magnetic path E which runs from the outer peripheral surface 32b of the permanent magnet piece 32 to the stator, and thus a magnetic path toward the stator can be assured through the central side rib 74 and the middle rib 75. The two first air gaps 71a, 71b are circumferentially disposed on the circle 62aC (see FIG. 3) and so located on a path through which short circuit magnetic flux flows around, and thus occurrence of a short circuit of the magnetic flux is reduced. Consequently, the rotor core 20 according to the first embodiment has a higher magnetic permeability.

Figure 12A:
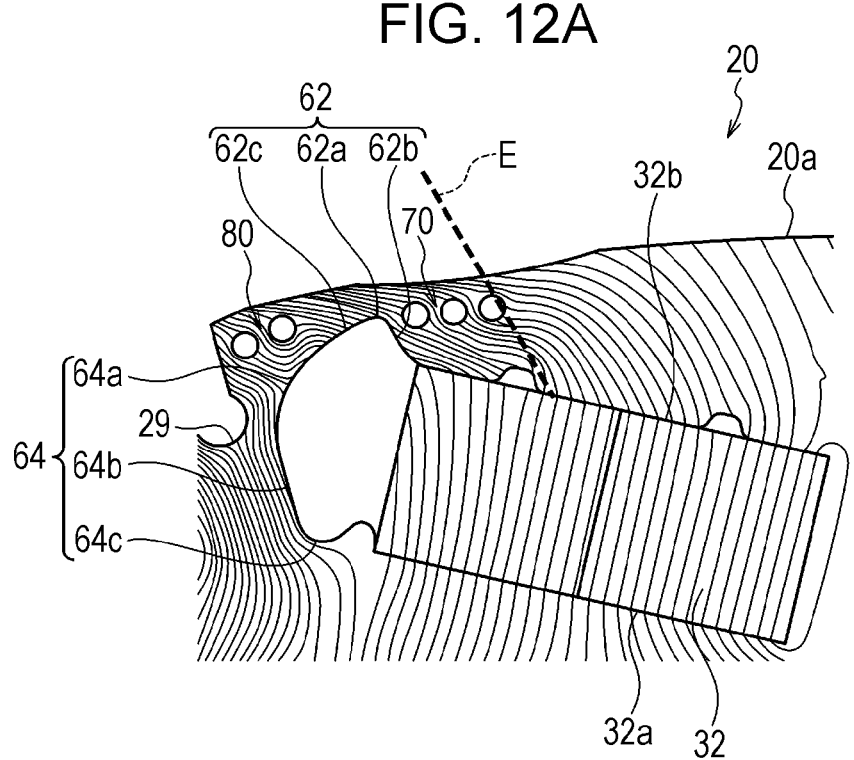
FIG. 12A is an enlarged view of a main portion illustrating magnetic paths in the rotor core according to the second embodiment.
Figure 12B:
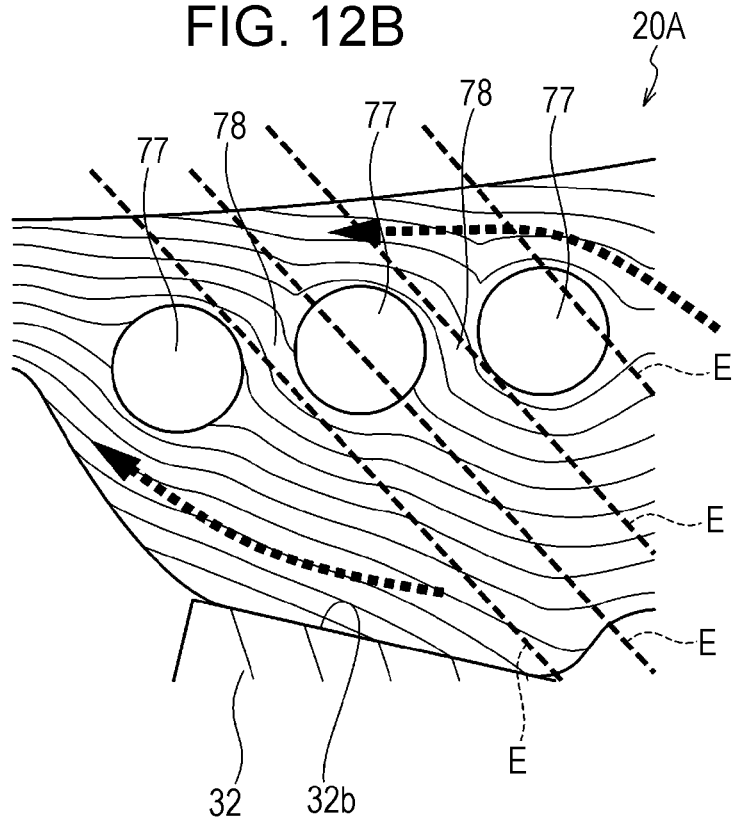
FIG. 12B is an enlarged view of FIG. 12A.

On the other hand, as illustrated in FIGS. 12A and 12B, in the rotor core 20A according to the second embodiment, when three fourth air gaps 77 are intended to be disposed on a magnetic flux short circuit path, the circumferential width of the rib 78 formed between the fourth air gaps 77 is reduced. Therefore, the fourth air gaps 77 are located on the inclined magnetic path E which runs from the outer peripheral surface 32b of the permanent magnet piece 32 to the stator, and the number of magnetic paths toward the stator through the rib 78 is reduced. Therefore, a magnetic path toward the stator is not likely to be formed on the rib 78, and as indicated by dotted line arrows (see FIG. 12B), magnetic paths toward the stator are mainly divided into a magnetic path which runs radially inwardly of the three fourth air gaps 77 and a magnetic path which runs radially outwardly thereof, and therefore magnetic flux saturation is likely to occur. Consequently, the magnetic permeability of the rotor core 20A according to the second embodiment is lower than the magnetic permeability in the first embodiment.

As illustrated in FIGS. 10A and 10B, in contrast to the second embodiment, the permanent magnet piece 32 according to the first embodiment has a larger area with high permeance P. Consequently, as illustrated in FIGS. 13 and 14, in contrast to the second embodiment, the rotor torque is increased and the degree of demagnetization is decreased in the first embodiment.

From a viewpoint of rotor torque and degree of demagnetization, the rotor core 20A according to the second embodiment is inferior to the rotor core 20 according to the first embodiment, but is provided with the first air gap section 70 and the second air gap section 80 to reduce occurrence of a short circuit of magnetic flux, and thus the rotor torque is increased and the degree of demagnetization is decreased as compared with the rotor core 200 (see FIG. 6) according to the comparative example.

Comparison Between First, Second, and Third Embodiments

Next, in order to compare the rotor cores 20, 20A (see FIGS. 2 and 9) in the first and second embodiments with a rotor core 20B (see FIG. 15) in a third embodiment in which only the configuration of the first air gap section 70 is modified, permeance distribution in the permanent magnet piece 32, rotor torque, and demagnetization of the permanent magnet piece 32 were analyzed.

Figure 15:
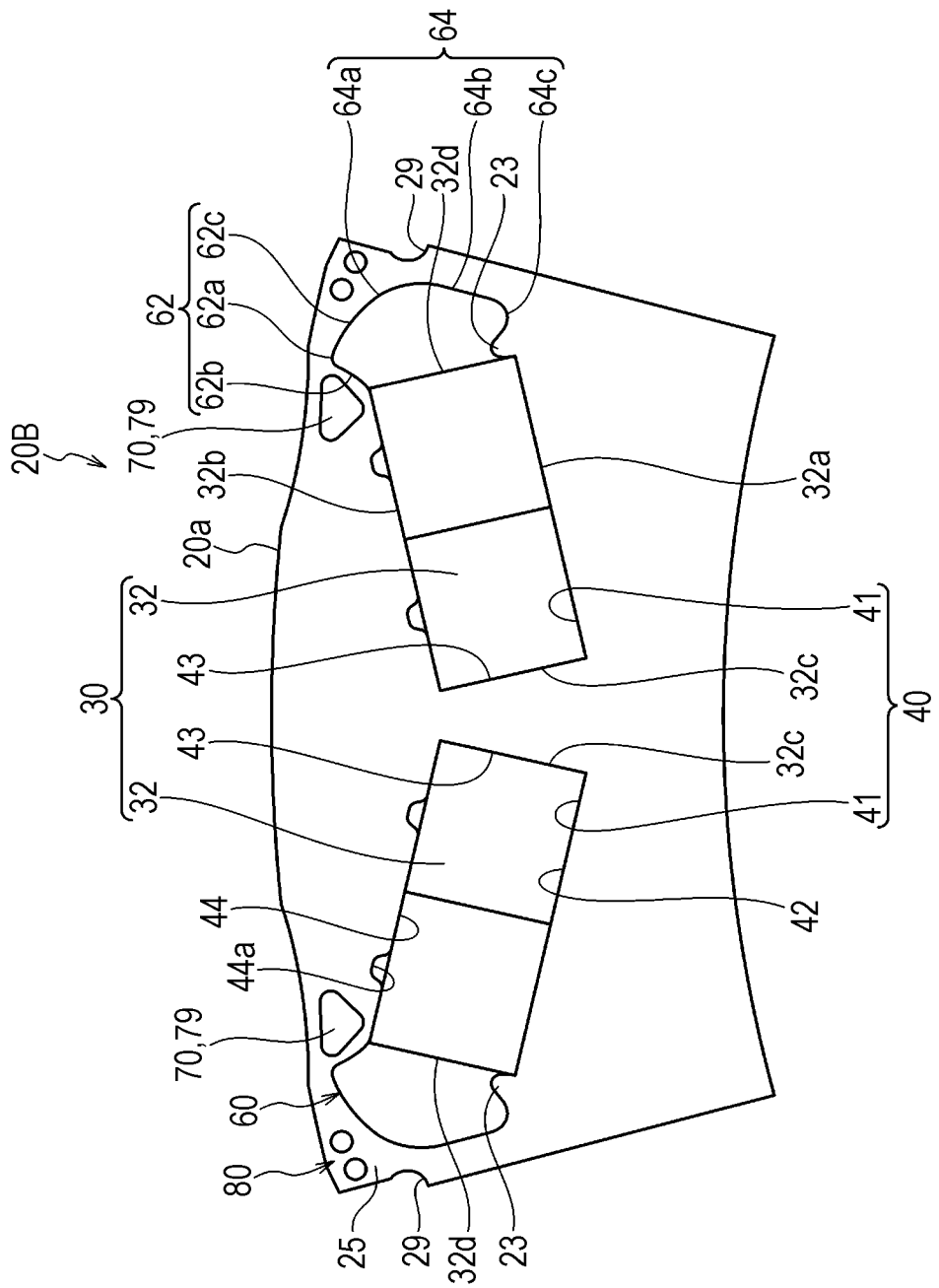
FIG. 15 is a partially enlarged view of a rotor core according to the third embodiment.
Figure 16:
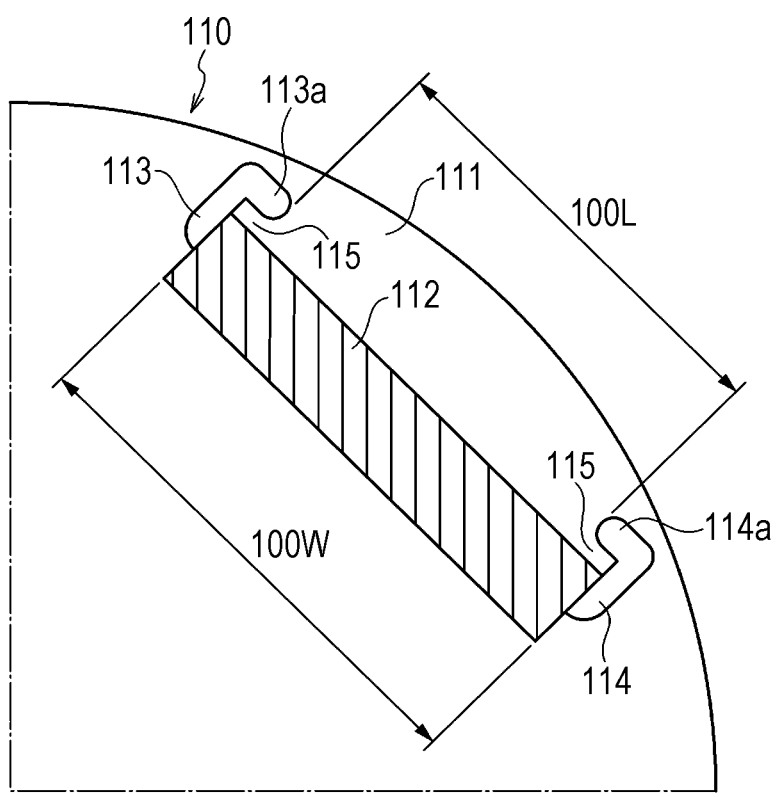
FIG. 16 is a partially enlarged view of a conventional rotor core.

As illustrated in FIG. 15, the rotor core 20B according to the third embodiment differs from the rotor core 20 (see FIG. 2) in the first embodiment in that the first air gap section 70 is formed as a single fifth air gap 79 in an inverse triangular shape. However, the rotor core 20B and the rotor core 20 share the same configuration except for this difference. The fifth air gap 79 is approximately the shape which is obtained by connecting the first air gaps 71a, 71b and the second air gap 72 to each other without a space in the first air gap section 70 (see FIG. 3) in the first embodiment instead of providing the central side rib 74, the middle rib 75, and the end side rib 76.

In the rotor core 20B according to the third embodiment, the first air gap section 70 is not provided with a rib, and thus magnetic paths toward the stator are mainly divided into a magnetic path which runs radially inwardly of the first air gap section 70 (the fifth air gap 79) and a magnetic path which runs radially outwardly thereof, and therefore magnetic flux saturation is more likely to occur as compared with the second embodiment. Consequently, the magnetic permeability of the rotor core 20B according to the third embodiment is lower than the magnetic permeability of the rotor core 20A according to the second embodiment.

As illustrated in FIGS. 10A to 10C, in contrast to the first and second embodiments, the permanent magnet piece 32 according to the third embodiment has a larger area with low permeance, and the degree of demagnetization is increased as illustrated in FIG. 14. As illustrated in FIG. 13, the rotor torque in the third embodiment is greater than the rotor torque in the second embodiment, and this is due to the effect of parameters other than permeance, such as a rotation control condition for the rotor and the shape of the stator.

In the rotor core 20B according to the third embodiment, occurrence of a short circuit of the magnetic flux is reduced by providing the first air gap section 70 and the second air gap section 80, and thus the rotor torque is increased and the degree of demagnetization is decreased as compared with the rotor core 200 (see FIG. 6) according to the comparative example.

As described above, in the rotor 10 of a rotary electric machine according to the first to third embodiments, occurrence of a short circuit of the magnetic flux of the permanent magnet 30 can be reduced by providing the projection barrier portion 62, and thus the torque of the rotary electric machine can be improved. The first air gap section 70 is formed in the area which faces the central peripheral edge 62b of the projection barrier portion 62 and the circumferentially outer end of the outer peripheral surface 32b of the permanent magnet piece 32, and thus occurrence of a magnetic flux short circuit is reduced. Because the first air gap section 70 is formed apart from the projection barrier portion 62 and the magnet insertion hole 40, decrease in the strength of the rotor core 20 can be reduced as compared with the case where the projection barrier portion 62 is extended to the vicinity of the outer peripheral surface 20a of the rotor core 20, or where the projection barrier portion 62 and the first air gap section 70 are integrally formed like a conventional rotor described in Japanese Unexamined Patent Application Publication No. 2000-278896.

Additionally, in the rotor cores 20, 20A, 20B, the second air gap section 80 is formed near the end side (the connection rib 25) of the magnetic pole 50 with respect to the projection barrier portion 62, and thus occurrence of a magnetic flux short circuit is further reduced.

Because the rotor 10 of a rotary electric machine according to the first and second embodiments has a configuration in which the first air gap section 70 is formed as an air gap group including a plurality of air gaps (the two first air gaps 71a, 71b and the second air gap 72 in the first embodiment, or the three fourth air gaps 77 in the second embodiment), decrease in the strength of the rotor cores 20, 20A can be reduced as compared with the case where a relatively large single air gap is formed.

Because the radially outer edge 73 of the air gaps included in the first air gap section 70 is provided inwardly of the extension line 62cL which circumferentially extends from the end peripheral edge 62c of the projection barrier portion 62 toward the central side of the magnetic pole 50, the air gaps are not formed in an area radially outwardly of the extension line 62cL where a relatively higher centrifugal stress occurs, and thus decrease in the strength of the rotor core 20 can be further reduced.

In the rotor 10 of a rotary electric machine in the first embodiment, the magnetic flux of the permanent magnet 30 is short circuited such that the flux flows around between the top portion 62a of the projection barrier portion 62 and the outer peripheral surface 20b of the rotor core 20, however, because the two first air gaps 71a, 71b are circumferentially disposed on the circle 62aC having an approximately the same radius as that of the top portion 62a of the projection barrier portion 62, and so disposed on a path through which short circuit magnetic flux flows around, occurrence of a short circuit of the magnetic flux of the permanent magnet 30 is effectively reduced. When the rotor 10 rotates, centrifugal force acts on the permanent magnet 30 and the rotor core 20, and stress is likely to occur on a radially outer side of the magnet insertion hole 40, however, due to the formation of the radially extending middle rib 75 between the two first air gaps 71a and 71b, decrease in the strength of the rotor core 20 on the radially outer side of the magnet insertion hole 40 can be reduced.

The second air gap 72 is formed in addition to the two first air gaps 71a, 71b, and thus occurrence of a short circuit of the magnetic flux of the permanent magnet 30 can be further effectively reduced. The central side rib 74 is formed between the central side first air gap 71a and the second air gap 72, and the end side rib 76 is formed between the end side first air gap 71b and the second air gap 72, and therefore, even when centrifugal force acts on the permanent magnet 30 and the rotor core 20 at the time of rotation of the rotor 10, decrease in the strength of the rotor core 20 can be reduced. In addition, a magnetic path toward the stator through the central side rib 74 and the middle rib 75 can be assured while reducing occurrence of a magnetic flux short circuit, and thus decrease in the magnetic permeability can be reduced and decrease in the permeance can be reduced. Therefore, demagnetization of the permanent magnet 30 can be reduced and each operating point of the permanent magnet 30 in B-H curve can be shifted toward the B-axis, and thus the rotor torque can be improved.

Because the end side first air gap 71b and the second air gap 72 are disposed along the central peripheral edge 62b of the projection barrier portion 62, the air gap group can be disposed by effectively using a space located near the projection barrier portion 62 on a radially outer side of the circumferentially outer end of the permanent magnet piece 32. Consequently, formation of a thin portion in the rotor core 20 is reduced, decrease in the strength of the rotor core 20 can be reduced, and occurrence of a short circuit of the magnetic flux of the permanent magnet 30 can be more effectively reduced.

The rotor 10 of a rotary electric machine according to the present disclosure is not limited to the above-described embodiments, and modification and improvement may be made as needed.

A first aspect of the present disclosure provides a rotor (for example, the rotor 10 of a rotary electric machine in the above-described embodiments) of a rotary electric machine, the rotor including: a rotor core (for example, the rotor cores 20, 20A, 20B in the above-described embodiments); and a plurality of magnetic poles (for example, the magnetic poles 50 in the above-described embodiments) which are circumferentially disposed inside the rotor core at predetermined intervals. The magnetic poles are magnetized in a radial direction and the direction of magnetization is alternately changed circumferentially, each of the magnetic poles is formed by inserting a permanent magnet (for example, the permanent magnet 30 in the above-described embodiments) into a magnet insertion hole (for example, the magnet insertion hole 40 in the above-described embodiments) which is formed in the rotor core, a side barrier (for example, the side barrier 60 in the above-described embodiments) including a magnetic air gap is formed in a portion which is adjacent to a circumferential end face (for example, the circumferentially outer end face 32d of the permanent magnet piece 32 in the above-described embodiments) of the permanent magnet, the side barrier includes a projection barrier portion (for example, the projection barrier portion 62 in the above-described embodiments) which is integrally formed with the side barrier and projects radially outwardly of an extension line (for example, the extension line 32$b$L in the above-described embodiments) from an outer peripheral surface (for example, the outer peripheral surface 32$b$ of the permanent magnet piece 32 in the above-described embodiments) of the permanent magnet, and an air gap section (for example, the first air gap set 70 in the above-described embodiments) including a magnetic air gap is formed in an area which is spaced apart from the projection barrier portion and the magnet insertion hole, and which faces a peripheral edge (for example, the central peripheral edge 62$b$ in the above-described embodiments) of a circumferentially central side of the magnetic pole with respect to the projection barrier portion, and a circumferential end of the outer peripheral surface of the permanent magnet. According to the first aspect of the present disclosure, occurrence of a short circuit of the magnetic flux of the permanent magnet can be reduced by providing the projection barrier portion, and thus the torque of the rotary electric machine can be improved. In addition, an air gap section is provided in an area which is spaced apart from the projection barrier portion and the magnet insertion hole, and which faces the peripheral edge of the central side of the magnetic pole with respect to the projection barrier portion and a circumferential end of the outer peripheral surface of the permanent magnet, and thus occurrence of a short circuit of the magnetic flux of the permanent magnet can be more effectively reduced. Because the air gap section is formed apart from the projection barrier portion and the magnet insertion hole, decrease in the strength of the rotor core can be reduced as compared with the case where the projection barrier portion is extended to the vicinity of the outer peripheral surface of the rotor core, or where the projection barrier portion and the air gap section are integrally formed like a conventional rotor described in Japanese Unexamined Patent Application Publication No. 2000-278896.

A second aspect of the present disclosure provides the rotor for a rotary electric machine according to the first aspect, in which the air gap section is formed as an air gap group which includes a plurality of air gaps (for example, the air gaps in the above-described embodiments). According to the second aspect of the present disclosure, the air gap section is formed as an air gap group which includes a plurality of air gaps, and occurrence of a short circuit of the magnetic flux of the permanent magnet can be reduced by forming a plurality of relatively small air gaps instead of a single air gap, and thus decrease in the strength of the rotor core can be reduced as compared with the case where a relatively large single air gap is formed.

A third aspect of the present disclosure provides the rotor for a rotary electric machine according to the second aspect, in which the air gap group has two first air gaps (for example, the first air gaps 71$a$, 71$b$ in the above-described embodiments) which are circumferentially disposed between an outer circumferential surface (for example, the outer circumferential surface 20$a$ in the above-described embodiments) of the rotor core and an outer peripheral surface of the magnet insertion hole, on a circle (for example, the circle 62$a$C in the above-described embodiments) having an approximately the same radius as a top portion (for example, the top 62$a$ in the above-described embodiments) located at a radially outermost position of the projection barrier portion. According to the third aspect of the present disclosure, the magnetic flux of the permanent magnet is short circuited such that the flux flows around between the top portion of the projection barrier portion and the outer peripheral surface of the rotor core, however, the two first air gaps are circumferentially disposed on the circle having an approximately the same radius as that of the radially outermost portion of the projection barrier portion, and so are disposed on a path through which short circuit magnetic flux flows around, and consequently, occurrence of a short circuit of the magnetic flux of the permanent magnet is effectively reduced. When the rotor rotates, centrifugal force acts on the permanent magnet and the rotor core, and stress is likely to be caused on the radially outer side of the magnet insertion hole, however, due to the formation of the radially extending rib between the two first air gaps, decrease in the strength of the rotor core on the radially outer side of the magnet insertion hole can be reduced.

A fourth aspect of the present disclosure provides the rotor for a rotary electric machine according to the second aspect, in which the air gap group includes: the two first air gaps which are circumferentially disposed between the outer circumferential surface of the rotor core and the outer peripheral surface of the magnet insertion hole, and a second air gap (for example, the second air gap 72 in the above-described embodiments) which is formed radially inwardly of the two first air gaps circumferentially between the two first air gaps. According to the fourth aspect of the present disclosure, the second air gap is formed in addition to the two first air gaps, and thus occurrence of a short circuit of the magnetic flux of the permanent magnet can be further effectively reduced. In addition, two ribs are formed between one first air gap and the second air gap and between the other first air gap and the second air gap, respectively and therefore, even when centrifugal force acts on the permanent magnet and the rotor core at the time of rotation of the rotor, decrease in the strength of the rotor core can be reduced. In addition, a magnetic path toward the stator can be assured through a rib formed between the one first air gap and the second air gap or between the other first air gap and the second air gap, and through a rib formed between the two first air gaps while reducing occurrence of a magnetic flux short circuit, and thus decrease in the magnetic permeability can be reduced and decrease in the permeance can be reduced. Therefore, demagnetization of the permanent magnet can be reduced and each operating point of the permanent magnet in B-H curve can be shifted toward the B-axis, and thus the torque can be improved.

A fifth aspect of the present disclosure provides the rotor for a rotary electric machine according to the fourth aspect, in which the projection barrier portion includes the top portion located at a radially outermost position of the projection barrier portion, a central peripheral edge (for example, the central peripheral edge 62$b$ in the above-described embodiments), and an end peripheral edge (for example, the end peripheral edge 62$c$ in the above-described embodiments), thereby forming an approximately triangular shape, the central peripheral edge radially inwardly extending from the top portion toward a circumferentially central side of the magnetic pole, the end peripheral edge radially inwardly extending from the top portion toward a circumferentially end side of the magnetic pole, and a first air gap out of the two first air gaps which is on the circumferentially end side of the magnetic pole, and the second air gap are disposed along the central peripheral edge. According to the fifth aspect of the present disclosure, the air gap group (the first air gap and the second air gap) can be disposed by effectively using a space located near the projection barrier portion on the radially outer side of the circumferentially end of the permanent magnet. Consequently, formation of a portion having a narrow width in the rotor core is reduced, decrease in the strength of the rotor core can be reduced, and occurrence of a short circuit of the magnetic flux of the permanent magnet can be more effectively reduced.

A sixth aspect of the present disclosure provides the rotor for a rotary electric machine according to the second aspect, in which the projection barrier portion includes the top portion located at a radially outermost position of the projection barrier portion, a central peripheral edge, and an end peripheral edge, thereby forming an approximately triangular shape, the central peripheral edge radially inwardly extending from the top portion toward a circumferentially central side of the magnetic pole, the end peripheral edge radially inwardly extending from the top portion toward a circumferentially end side of the magnetic pole, and a radially outer edge (for example, the radially outer edge 73 in the above-described embodiments) of the air gap group is provided on or inwardly of an extension line (for example, the extension line 62CL in the above-described embodiments) which extends from the end peripheral edge toward the circumferentially central side of the magnetic pole. According to the sixth aspect of the present disclosure, decrease in the strength of the rotor core is reduced by providing the air gap group radially inwardly of a belt-like area, in which a relatively higher stress occurs and which is formed outwardly of the extension line which circumferentially extends from the end peripheral edge of the projection barrier portion toward the central side of the magnetic pole.

A seventh aspect of the present disclosure provides the rotor for a rotary electric machine according to the first aspect, further including another air gap section (for example, the second air gap section 80 in the above-described embodiments) which is formed on the circumferentially end side of the magnetic pole with respect to the projection barrier portion. According to the seventh aspect of the present disclosure, the air gap section is formed on each of the circumferentially central side and end side of the magnetic pole with respect to the projection barrier portion, and thus occurrence of a short circuit of the magnetic flux of the permanent magnet can be more effectively reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor for a rotary electric machine, the rotor comprising:
   a rotor core;
   a plurality of magnetic poles provided in the rotor core along a circumferential direction of the rotor core at predetermined intervals, each of the plurality of magnetic poles comprising:
      a magnet insertion hole provided in the rotor core; and
      a permanent magnet provided in the magnet insertion hole so that a magnetized direction of the permanent magnet extends substantially in a radial direction of the rotor core and the magnetized direction is alternately changed circumferentially, the permanent magnet is formed by a pair of permanent magnet pieces that are circumferentially separated;
   a side barrier as a magnetic air gap provided in the rotor core at a portion adjacent to a circumferential end face of the permanent magnet, the side barrier including a projection barrier portion projecting radially outwardly from an extension line extending from an outer peripheral surface of the permanent magnet; and
   an air gap section as a magnetic air gap provided in the rotor core at an area which is spaced apart from the projection barrier portion and the magnet insertion hole, the air gap section facing a peripheral edge of a circumferentially central side of the magnetic pole with respect to the projection barrier portion and a circumferential end of the outer peripheral surface of the permanent magnet,
   wherein the projection barrier portion includes a top portion located at a radially outermost position of the projection barrier portion,
   wherein at least a portion of the air gap section is provided closer to an outer peripheral surface of the rotor core than the top portion,
   wherein the air gap section is formed as an air gap group which includes a plurality of air gaps,
   wherein the air gap group includes:
      two first air gaps provided circumferentially between an outer circumferential surface of the rotor core and the outer peripheral surface of the magnet insertion hole, and
      a second air gap which is formed radially inwardly of the two first air gaps circumferentially between the two first air gaps,
   wherein each of the two first air gaps has a substantially circular shape with a center, and
   wherein the second air gap has a substantially circular shape and is provided entirely radially inward of a line connecting the center of one of the two first air gaps and the center of another of the two first air gaps.

2. The rotor for a rotary electric machine according to claim 1,
   wherein the two first air gaps are provided on a circle having a radius measured from a center of the rotor core to the top portion located at a radially outermost position of the projection barrier portion.

3. The rotor for a rotary electric machine according to claim 1,
   wherein the projection barrier portion includes the top portion, a central peripheral edge, an end peripheral edge, and the extension line forming a triangular shape, the central peripheral edge radially inwardly extending from the top portion toward the circumferentially central side of the magnetic pole, the end peripheral edge radially inwardly extending from the top portion toward a circumferentially end side of the magnetic pole, and
   a first air gap out of the two first air gaps provided on the circumferentially end side of the magnetic pole, and the second air gap provided along the central peripheral edge.

4. The rotor for a rotary electric machine according to claim 1,
   wherein the projection barrier portion includes the top portion, a central peripheral edge, an end peripheral edge, and the extension line forming a triangular shape, the central peripheral edge radially inwardly extending from the top portion toward the circumferentially central side of the magnetic pole, the end peripheral edge radially inwardly extending from the top portion toward a circumferentially end side of the magnetic pole, and
   a radially outer edge of the air gap group is provided on or inwardly of an extension line which extends from the end peripheral edge toward the circumferentially central side of the magnetic pole.

5. The rotor for a rotary electric machine according to claim 1, further comprising
another air gap section provided on a circumferentially end side of the magnetic pole with respect to the projection barrier portion.

6. The rotor for a rotary electric machine according to claim 5, wherein the another air gap section is formed as an air gap group which includes a plurality of air gaps.

7. The rotor for a rotary electric machine according to claim 6, wherein the air gaps of the another air gap section are round holes.

8. The rotor for a rotary electric machine according to claim 1, wherein the permanent magnet pieces are linearly aligned in the magnet insertion hole in series along an elongated direction of the magnet insertion hole.

9. The rotor for a rotary electric machine according to claim 1, wherein the air gap section is formed as an air gap group which includes three holes having a same shape and a same size as each other.

10. A rotor for a rotary electric machine, the rotor comprising:
a rotor core;
a plurality of magnetic poles provided in the rotor core along a circumferential direction of the rotor core at predetermined intervals, each of the plurality of magnetic poles comprising:
a magnet insertion hole provided in the rotor core; and
a permanent magnet provided in the magnet insertion hole so that a magnetized direction of the permanent magnet extends substantially in a radial direction of the rotor core and the magnetized direction is alternately changed circumferentially;
a side barrier as a magnetic air gap provided in the rotor core at a portion adjacent to a circumferential end face of the permanent magnet, the side barrier including a projection barrier portion projecting radially outwardly from an extension line extending from an outer peripheral surface of the permanent magnet; and
an air gap section as a magnetic air gap provided in the rotor core at an area which is spaced apart from the projection barrier portion and the magnet insertion hole, the air gap section facing a peripheral edge of a circumferentially central side of the magnetic pole with respect to the projection barrier portion and a circumferential end of the outer peripheral surface of the permanent magnet,
wherein the projection barrier portion includes a top portion located at a radially outermost position of the projection barrier portion,
wherein at least a portion of the air gap section is provided closer to an outer peripheral surface of the rotor core than the top portion,
wherein the air gap section is formed as an air gap group which includes three circular holes,
wherein the air gap section is formed as an air gap group which includes a plurality of air gaps,
wherein the air gap group includes:
two first air gaps provided circumferentially between an outer circumferential surface of the rotor core and the outer peripheral surface of the magnet insertion hole, and
a second air gap which is formed radially inwardly of the two first air gaps circumferentially between the two first air gaps,
wherein each of the two first air gaps has a substantially circular shape with a center, and
wherein the second air gap has a substantially circular shape and is provided entirely radially inward of a line connecting the center of one of the two first air gaps and the center of another of the two first air gaps.

11. The rotor for a rotary electric machine according to claim 10, wherein the three circular holes are arranged in a shape of a triangle.

12. A rotor for a rotary electric machine, the rotor comprising:
a rotor core;
a plurality of magnetic poles provided in the rotor core along a circumferential direction of the rotor core at predetermined intervals, each of the plurality of magnetic poles comprising:
a magnet insertion hole provided in the rotor core; and
a permanent magnet provided in the magnet insertion hole so that a magnetized direction of the permanent magnet extends substantially in a radial direction of the rotor core and the magnetized direction is alternately changed circumferentially;
a side barrier as a magnetic air gap provided in the rotor core at a portion adjacent to a circumferential end face of the permanent magnet, the side barrier including a projection barrier portion projecting radially outwardly from an extension line extending from an outer peripheral surface of the permanent magnet; and
an air gap section as a magnetic air gap provided in the rotor core at an area which is spaced apart from the projection barrier portion and the magnet insertion hole, the air gap section facing a peripheral edge of a circumferentially central side of the magnetic pole with respect to the projection barrier portion and a circumferential end of the outer peripheral surface of the permanent magnet,
wherein the projection barrier portion includes a top portion located at a radially outermost position of the projection barrier portion,
wherein at least a portion of the air gap section is provided closer to an outer peripheral surface of the rotor core than the top portion,
wherein the air gap section is formed as an air gap group which includes three holes having a same shape and a same size as each other,
wherein the air gap section is formed as an air gap group which includes a plurality of air gaps,
wherein the air gap group includes:
two first air gaps provided circumferentially between an outer circumferential surface of the rotor core and the outer peripheral surface of the magnet insertion hole, and
a second air gap which is formed radially inwardly of the two first air gaps circumferentially between the two first air gaps,
wherein each of the two first air gaps has a substantially circular shape with a center, and
wherein the second air gap has a substantially circular shape and is provided entirely radially inward of a line connecting the center of one of the two first air gaps and the center of another of the two first air gaps.

* * * * *